United States Patent [19]

Geary

[11] Patent Number: 5,247,016
[45] Date of Patent: Sep. 21, 1993

[54] CORROSION RESISTANT PRIMER AND METHOD OF USE THEREOF IN PROTECTING METAL SURFACES

[75] Inventor: Richard W. Geary, Houston, Tex.

[73] Assignee: Tek-Rap, Inc., Houston, Tex.

[21] Appl. No.: 736,204

[22] Filed: Jul. 26, 1991

[51] Int. Cl.[5] .................... C08L 61/10; C08L 61/14; C08L 9/00
[52] U.S. Cl. .................................. 525/133; 525/141
[58] Field of Search ............................... 525/141, 133

[56] References Cited

U.S. PATENT DOCUMENTS

| | | | |
|---|---|---|---|
| 2,839,443 | 6/1958 | Fleming et al. | 525/141 |
| 2,847,715 | 8/1958 | Dosmann | 525/141 |
| 3,028,356 | 4/1962 | Shepard | 525/141 |
| 3,165,496 | 1/1965 | Fusco et al. | 525/141 |
| 3,674,735 | 7/1972 | Callan | 524/574 |
| 3,752,780 | 8/1975 | Petersen et al. | 525/141 |
| 4,127,545 | 11/1978 | Callan et al. | 525/141 |

OTHER PUBLICATIONS

1989 *Rubber Directory+Buyers Guide.*
1986 *Rubber Red Book.*
1982 *Blue Book.*

*Primary Examiner*—James J. Seidleck
*Assistant Examiner*—W. R. M. Clark
*Attorney, Agent, or Firm*—Salter, Michaelson & Benson

[57] ABSTRACT

A primer for protecting the exterior surfaces of an underground metal pipe against corrosion at temperatures of up to 250° F. includes a butyl elastomer, an aliphatic hydrocarbon resin, a heat curable phenolic resin which crosslinks at between approximately 180° F. and 250° F., and a hydrocarbon solvent. The primer can be effectively utilized in a method which includes the steps of applying the primer to the exterior surface of a metal pipe, allowing the primer to at least partially cure, and applying a protective adhesive tape to the pipe over the primer.

4 Claims, 1 Drawing Sheet

CORROSION RESISTANT PRIMER AND METHOD OF USE THEREOF IN PROTECTING METAL SURFACES

BACKGROUND AND SUMMARY OF THE INVENTION

The instant invention relates to the protection of metal surfaces against corrosion and more particularly, to a method of protecting metal surfaces, such as the exterior surface of a steel pipe, against corrosion at temperatures of up to 250° F. and to a primer which is adapted for use in the method.

Steel pipes have been widely utilized for transporting fluids, such as water, oil, and gas, for many years in both above ground and underground applications. However, it has been found that steel pipes utilized in underground applications tend to rapidly corrode, due to both oxidation and electrolysis unless the exterior surfaces thereof are adequately protected with suitable corrosion resistant materials. Consequently, various protective tape coating systems have been developed over the years for protecting the exterior surfaces of underground steel pipes against corrosion. Many of the currently available tape coating systems comprise primers which are applied directly to the exterior surfaces of metal pipes and protective adhesive tapes which are spirally wrapped around the exterior surfaces of pipes over the respective primers thereon. The heretofore available primers have generally comprised elastomers, resins, colorants, fillers and solvents. However, it has been found that primers of this type are frequently responsible for tape disbondment when they are utilized on underground pipes carrying relatively high temperature materials. Specifically, it has been found that primers of this type tend to oxidize and become plasticized by oils migrating from tape adhesives when they are exposed to temperatures in excess of approximately 180° F. It has been further found that tape disbondment resulting from primer failure is generally accelerated when cathodic protection is applied as a secondary type of corrosion protection to an underground pipe system. Hence, there is a recognized need for an improved primer for protecting the exterior surfaces of underground pipe systems against corrosion in applications where the pipe systems are exposed to temperatures of between approximately 180° F. and 250° F.

The instant invention provides an effective primer which can be utilized in combination with an adhesive tape for protecting the exterior surfaces of an underground metal pipe system against corrosion at temperatures of up to 250° F., even in applications where cathodic protection is applied to the pipe system. More specifically, the instant invention provides an effective primer which is capable of adhering to the metal surfaces of a pipe at elevated temperatures in the presence of cathodic anticorrosion protection. Still more specifically, it has been found that by adding a heat reactive phenolic resin to a conventional corrosion resistant primer comprising a butyl elastomer, an aliphatic resin, fillers and colorants, and one or more solvents, the resulting primer formulation can be effectively utilized in a tape corrosion protection system for protecting metal surfaces at temperatures of up to 250° F. in the presence of cathodic corrosion protection. In particular, the primer of the instant invention comprises between approximately 1% and 10% by weight of a butyl elastomer, between approximately 1% and 20% by weight of an aliphatic hydrocarbon resin, a quantity of a heat curable phenolic resin equal to between approximately 2% and 20% of the weight of the aliphatic hydrocarbon resin, and between approximately 26% and 98% of a solvent. The aliphatic hydrocarbon resin utilized in the primer is selected so that it has a softening point of between approximately 70° F. and 150° F., and it is selected so that it is compatible with the butyl elastomer. The heat curable phenolic resin is selected so that it is compatible with both the butyl elastomer and the aliphatic hydrocarbon resin, and so that it crosslinks at between approximately 180 F and 250° F.. The solvent is selected so that it is compatible with the butyl elastomer, the aliphatic hydrocarbon resin, and the heat curable phenolic resin.

In the preferred formulation of the primer of the instant invention, the butyl elastomer has a Mooney viscosity of between approximately 40 and 50 at 100° C., and a Mooney viscosity of between 45 and 55 at 125° C.. Further, the solvent preferably comprises either an aromatic petroleum solvent or an aliphatic petroleum solvent, and the heat curable phenolic resin preferably comprises either bromo methyl alkylated phenol formaldehyde resin, or methyl alkyl substituted phenolic resin.

The method of protecting a metal surface of the instant invention comprises applying a primer of the above described type to the metal surface, allowing the primer to at least partially cure, and applying a protective adhesive tape to the metal surface over the primer. The metal surface preferably comprises an exterior surface of a metal pipe which has been cleaned, such as by sandblasting, prior to applying the primer thereto and the primer is preferably only allowed to partially cure before the adhesive tape is applied. The adhesive tape preferably comprises a conventional butyl based adhesive tape of the general type which is adapted for use in protecting the exterior surfaces of metal pipe.

It has been found that the method of the instant invention can be effectively utilized for applying the primer of the instant invention to steel pipes in order to protect the pipes against corrosion. In this connection, it has been found that the primer of the instant invention as applied by the above-described method can be effectively utilized for protecting metal pipes against corrosion at temperatures of up to 250° F., and that the primer can even be effectively utilized for protecting metal pipes which are further protected against corrosion by cathodic protection. Hence, it has been found that that the primer and method of the instant invention represent effective solutions to the problem of protecting underground pipes carrying relatively high temperatures liquids against corrosion.

Accordingly, it is a primary object of the instant invention to provide an improved primer for protecting a metal surface against corrosion.

Another object of the instant invention is to provide an effective primer for protecting the exterior surfaces of a metal underground pipe utilized for carrying a relatively high temperature liquid against corrosion.

A further object of the instant invention is to provide an effective primer for protecting the exterior surfaces of a metal underground pipe utilized for carrying a relatively high temperature liquid against corrosion regardless of whether or not the pipe is subjected to cathodic protection.

An even still further object of the instant invention is to provide a method of protecting the exterior surfaces of a metal underground pipe utilized for carrying a relatively high temperature liquid against corrosion.

An even still further object of the instant invention is to provide an effective method of protecting the exterior surfaces of an underground metal pipe utilized for carrying a relatively high temperature liquid against corrosion, regardless of whether or not cathodic protection is applied to the pipe.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figure 1:
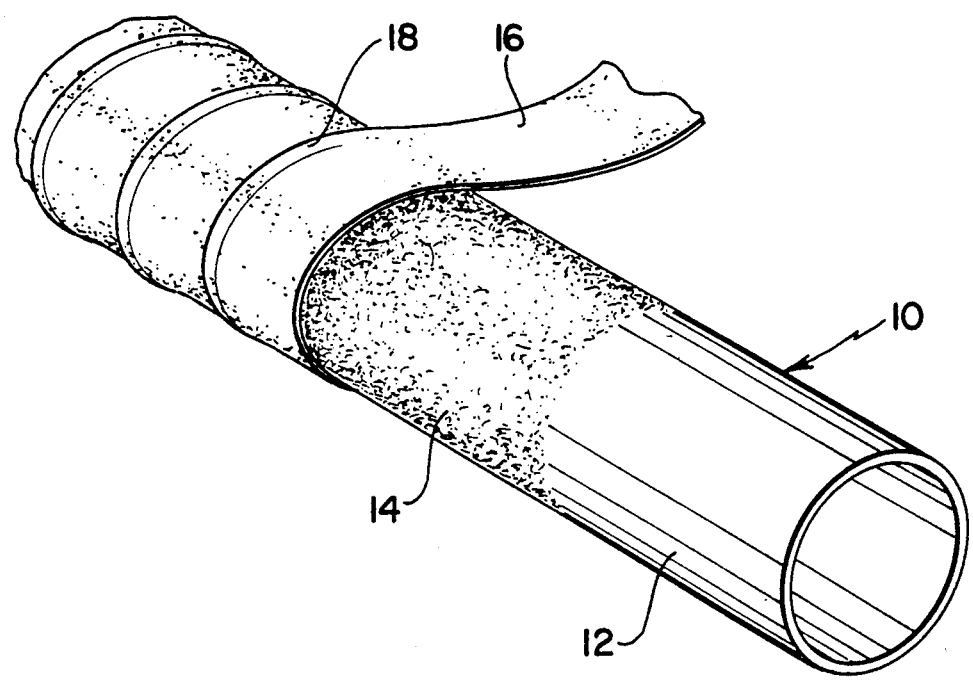
FIG. 1 is a perspective view illustrating the method of the instant invention as applied to a metal pipe.

The instant invention relates to an effective primer for protecting a metal surface against corrosion, and to a method of protecting a metal surface against corrosion utilizing the primer of the subject invention. In this regard, the primer of the subject invention is specifically formulated to resist disbondment due to oxidation, plasticization caused by the migration of oils from tape adhesives, and/or the effects of cathodic protection at temperatures of up to 250° F.

The primer of the instant invention comprises between approximately 1% and 10% by weight of a butyl elastomer, between approximately 1% and 10% by weight of an aliphatic hydrocarbon resin, a quantity of heat curable phenolic resin equal to between approximately 2% and 20% of the weight of the aliphatic hydrocarbon resin, and between approximately 26% and 98% by weight of a solvent. The aliphatic hydrocarbon resin is selected so that it has a softening point of between approximately 70° F. and 150° F., and so that it is compatible with the butyl elastomer. The hent curable phenolic resin is specifically selected so that it is compatible with both the butyl elastomer and the aliphatic hydrocarbon resin, and so that it crosslinks at between approximately 180° F. and 250° F. The solvent comprises a solvent which is compatible with the butyl elastomer, the aliphatic hydrocarbon resin, and the heat curable phenolic resin. The butyl elastomer is preferably selected so that it has a Mooney viscosity of between approximately 40 and 50 at 100° C., and a Mooney viscosity of between approximately 45 and 55 at 125° C. The heat curable phenolic resin preferably comprises either bromo methyl alkylated phenol formaldehyde resin, or methyl alkyl substituted phenolic resin, and the solvent preferably comprises either an aromatic petroleum solvent, or an aliphatic petroleum solvent.

The method of the instant invention is carried out by applying a primer of the above described formulation to a metal surface, allowing the primer to at least partially cure, and applying a protective adhesive tape &o the metal surface over the primer. The method is preferably applied to a metal pipe, and it preferably further comprises a step of cleaning the exterior surface of the pipe, such as by sandblasting or wire brushing, prior to applying the primer thereto. The primer is preferably only allowed to partially cure before the tape is applied thereto. The tape which is applied to the primer preferably comprises a butyl based adhesive tape, and the tape is preferably spirally wrapped around the pipe so as to provide overlapping seam areas between adjacent sections of tape on the pipe.

Referring now to the drawing, the method of the instant invention as applied to a section of pipe 10 is illustrated. The exterior surface of the pipe 10 is preferably first cleaned by sandblasting and/or wire brushing to provide a cleaned exterior surface area 12. A primer 14 of the above described type is then applied directly to the cleaned surface 12 and allowed to at least partially cure. The primer 14 is preferably either applied by spraying or brushing to a suitable thickness sufficient to wet the pipe surface and to fill in any scratches, pitts, or voids therein. After the primer 14 has at least partially cured, an adhesive tape 16 is spirally wrapped on the exterior surface of the pipe 10 over the primer 14. In this connection, the tape 16 preferably comprises a suitable protective adhesive tape, such as a butyl based adhesive tape, and the tape 16 is preferably spirally wrapped on the pipe 10 so as to produce overlapping seam areas 18 between adjacent sections of the tape 16.

It has been found that once a primer 14 and a tape 16 have been applied to a pipe 10 in the manner hereinabove set forth, the pipe 10 can be exposed to temperatures of up to 250° F. without causing significant deterioration or disbondment of the primer 14, and/or the tape 16. In this connection, it has been found that the primer 14 is resistant to oxidation and that it is also resistant to plasticization resulting from the migration of oils from the adhesive in the tape 16. In this regard, it has been found that when the heat reactive phenolic resin in the primer is exposed to temperatures in excess of 180° F. it causes a sufficient degree of crosslinking in the primer to significantly improve the bond between the primer 14 and the surface 12. It has been further found that because the primer 14 remains somewhat soft at ambient temperatures it effectively remains bonded to the surface 12 over a wide range of temperatures which include ambient temperatures.

In order to test the effectiveness of the primer of the instant invention two test formulations (examples I and II below), were prepared and applied to two sets of pipe samples. A third primer (example III below), was prepared as a conventional primer without a heat reactive phenolic resin. The third primer was also applied to two pipe samples and all of the pipe samples were then tested. The three sample primers were prepared in accordance with the following formulations:

EXAMPLE I

| Ingredient | WT. % |
|---|---|
| Butyl Elastomer | 9.90 |
| Aliphatic Resin | 17.82 |
| Heat Reactive Phenolic Resin (bromo-methyl alkylated phenol formaldehyde resin) | 1.98 |
| Fillers and Colorants | 0.30 |
| Solvents (aliphatic and aromatic) | 70.00 |
| | 100.00 |

EXAMPLE II

| Ingredient | WT. % |
| --- | --- |
| Butyl Elastomer | 9.90 |
| Aliphatic Resin | 17.82 |
| Heat Reaction Phenolic Resin (methyl alkyl substituted phenolic resin) | 1.98 |
| Fillers and Colorants | 0.30 |
| Solvents (aliphatic and aromatic) | 70.00 |
| | 100.00 |

EXAMPLE III

| Ingredient | WT. % |
| --- | --- |
| Butyl Elastomer | 9.90 |
| Aliphatic Resin | 19.80 |
| Fillers and Colorants | 0.30 |
| Solvent (aliphatic or aromatic) | 70.00 |
| | 100.00 |

In preparing the above primer formulations, examples I and II were prepared by mixing all of the respective components together, except the respective hat reactive phenolic resins thereof, and then heating the mixed components to temperatures of approximately 250° F. to produce fully blended mixtures. The primer formulations were then cooled, and their respective heat reactive phenolic resins were added. The remaining mixtures were then blended until all of the respective heat reactive phenolic resins thereof were fully dissolved. The formulation prepared in example III, on the other hand, was prepared by mixing all of the ingredients thereof together and heating the resulting mixture to approximately 200° F. until all of the components thereof had fully dissolved.

After the three primers had been prepared in accordance with examples I, II, and III, they were tested in accordance with ASTM-G-8 testing procedure. In accordance with this procedure, six two-inch diameter pipe sections were cut to approximately 12 inches in length, and the primers prepared in accordance with examples I, II, and III were each applied to two different pipe samples. The pipe samples were then spirally wrapped utilizing a butyl based adhesive tape. Further, one end of each of the pipe samples was then capped utilizing a heat shrinkable pipe end cap, and a one-quarter inch hole, or holiday, was formed in the tape and primer on each sample. One pipe sample from each of examples I, II, and III, was then immersed in a test vessel containing an electrolyte solution at ambient temperature and cathodic protection was applied to each pipe sample in the ambient test vessel by connecting a positive electrode thereto, immersing a negative electrode into the ambient electrolyte solution and applying a 1.5 volt potential thereacross. The pipe samples in the ambient electrolyte solution were then left at ambient conditions for a period of thirty days, and at the end of the thirty day test period it was determined that the holidays in the three pipe samples had, in each instance, expanded to approximately 1.2 inches in diameter. The remaining three pipe samples were internally filled to within two inches of the upper ends thereof with No. 2 heating oil, and immersed in an electrolyte solution. These pipe samples were also connected to positive electrodes and a negative electrode was immersed into the electrolyte solution for catholically protecting the pipe samples with a 1.5 volt potential. However, in this instance, immersion heaters were placed in the heating oils in the pipe samples, and the heating oils were maintained at temperatures of between 225° F. and 250° F. for a period of thirty days. It was found that in this case at the end of thirty days the one-quarter inch holidays in the two pipe samples which had been coated with the primers of examples I and II had expanded to approximately 1.5 inches in diameter each. However, the one-quarter inch holiday in the coating on the pipe sample which had been coated with the primer prepared in accordance with example III had resulted in total failure and disbondment of the tape and primer from the surface of the pipe sample. Hence, it was concluded that the addition of heat reactive phenolic resins to the primers in examples I and II had dramatically improved the bonding characteristics between the primers and both the steel pipes and the adhesive tapes at temperatures of up to 250° F.

In further testing it was also discovered that, while other heat activated resins improved the bond strength at higher temperatures, they failed to maintain the bond strength when placed under cathodic protection in accordance with the ASTM-G-8 procedure. Hence, it was concluded that the use of a heat reactive phenolic resin is essential to the primer of the subject invention.

It is seen, therefore, that the instant invention provides an effective primer and method for protecting the exterior surfaces of metal objects, such as steel pipe. In this connection, the primer of the instant invention includes a heat reactive phenolic resin which significantly improves the bonding characteristics of the primer to both steel pipe and to adhesive tape at temperatures of up to 250° F., regardless of whether or not the pipe is exposed to cathodic protection. Hence, it is seen that the primer and method of the instant invention represent significant advancements in the art relating to protective coating materials, and that they have substantial commercial merit.

While there is shown and described herein certain specific structure embodying the invention, it will be manifest to those skilled in the art that various modifications and rearrangements of the parts may be made without departing from the spirit and scope of the underlying inventive concept, and that the same is not limited to the particular forms herein shown and described except insofar as indicated by the scope of the appended claims.

What is claimed is:

1. A primer for metal surfaces consisting essentially of:
    a. between approximately 1% and 10% by weight of a butyl elastomer;
    b. between approximately 1% and 20% by weight of an aliphatic hydrocarbon resin having a softening point of between approximately 70° F. and 150° F., said aliphatic hydrocarbon resin being compatible with said butyl elastomer;
    c. a quantity of heat curable phenolic resin equal to between approximately 2% and 20% of the weight of said aliphatic hydrocarbon resin, said heat curable phenolic resin being compatible with both said butyl elastomer and said aliphatic hydrocarbon resin and crosslinking at between approximately 180° F. and 250° F.; and
    d. between approximately 26% and 98% of a solvent which is compatible with said butyl elastomer, said aliphatic hydrocarbon resin, and said heat curable phenolic resin.

2. In the primer of claim 1, said butyl elastomer having a Mooney viscosity between approximately 40 and 50 at 100° C. and a Mooney viscosity of between approximately 45 and 55 at 125° C.

3. In the primer of claim 1, said solvent being selected from a group consisting of aromatic petroleum solvents and aliphatic petroleum solvents.

4. In the primer of claim 1, said heat curable phenolic resin being selected from a group consisting of bromo methyl alkylated phenolic formaldehyde resin and methyl alkyl substituted phenolic resin.

* * * * *